No. 732,221. PATENTED JUNE 30, 1903.
A. F. POTVIN.
TRANSFERRING DEVICE FOR BRICK MACHINES.
APPLICATION FILED AUG. 22, 1902. RENEWED MAY 2, 1903.
NO MODEL. 2 SHEETS—SHEET 1.

Witnesses:
H. B. Davis.
Maud M. Piper.

Inventor:
Alphonse F. Potvin
by Noyes & Hamilton
Atty's

No. 732,221. PATENTED JUNE 30, 1903.
A. F. POTVIN.
TRANSFERRING DEVICE FOR BRICK MACHINES.
APPLICATION FILED AUG. 22, 1902. RENEWED MAY 2, 1903.

NO MODEL. 2 SHEETS—SHEET 2.

Witnesses:
H. B. Davis.
Maud M. Piper.

Inventor:
Alphonse F. Potvin
by Noyes & Hamman
Attys

No. 732,221. Patented June 30, 1903.

UNITED STATES PATENT OFFICE.

ALPHONSE F. POTVIN, OF PLAISTOW, NEW HAMPSHIRE.

TRANSFERRING DEVICE FOR BRICK-MACHINES.

SPECIFICATION forming part of Letters Patent No. 732,221, dated June 30, 1903.

Application filed August 22, 1902. Renewed May 2, 1903. Serial No. 155,427. (No model.)

*To all whom it may concern:*

Be it known that I, ALPHONSE F. POTVIN, of Plaistow, county of Rockingham, State of New Hampshire, have invented an Improvement in Transferring Devices for Brick-Machines, of which the following description, in connection with the accompanying drawings, is a specification, like characters on the drawings representing like parts.

In that class of brick-machines which deliver the bricks onto an endless carrier as fast as they are molded it has been customary to employ a number of workmen to remove the bricks from the carrier by hand and load them onto trucks, so that they may be carried to the yard where they are dried. This method is objectionable in that the green bricks are often damaged by the fingers of the workmen in transferring them from the carrier to the trucks and in that it requires the services of a considerable number of men to remove the bricks from the carrier as fast as they are delivered thereon by the machine.

The object of my invention is to provide a device for transferring the bricks from the carrier to the trucks which will make it unnecessary for the workmen to touch the bricks with their hands and which will enable a single workman to transfer the bricks from the carrier to the trucks as fast as they are delivered thereon by the machine, even if the machine delivers the bricks to the carrier with much greater frequency than has previously been customary. I accomplish this object by disposing a brick-obstructing wall crosswise the smooth-surfaced endless carrier of a brick-molding machine, which causes the bricks to be collected close together on the carrier while the carrier slides under them, and by employing in connection therewith an elongated brick-engaging device, which is located at one side of the carrier and is movable across it, whereby the workman can discharge all the bricks which have been thus collected from the carrier to the platform of the truck.

The particular means which I preferably employ in carrying out my invention is illustrated in the accompanying drawings, in which—

Figure 1:
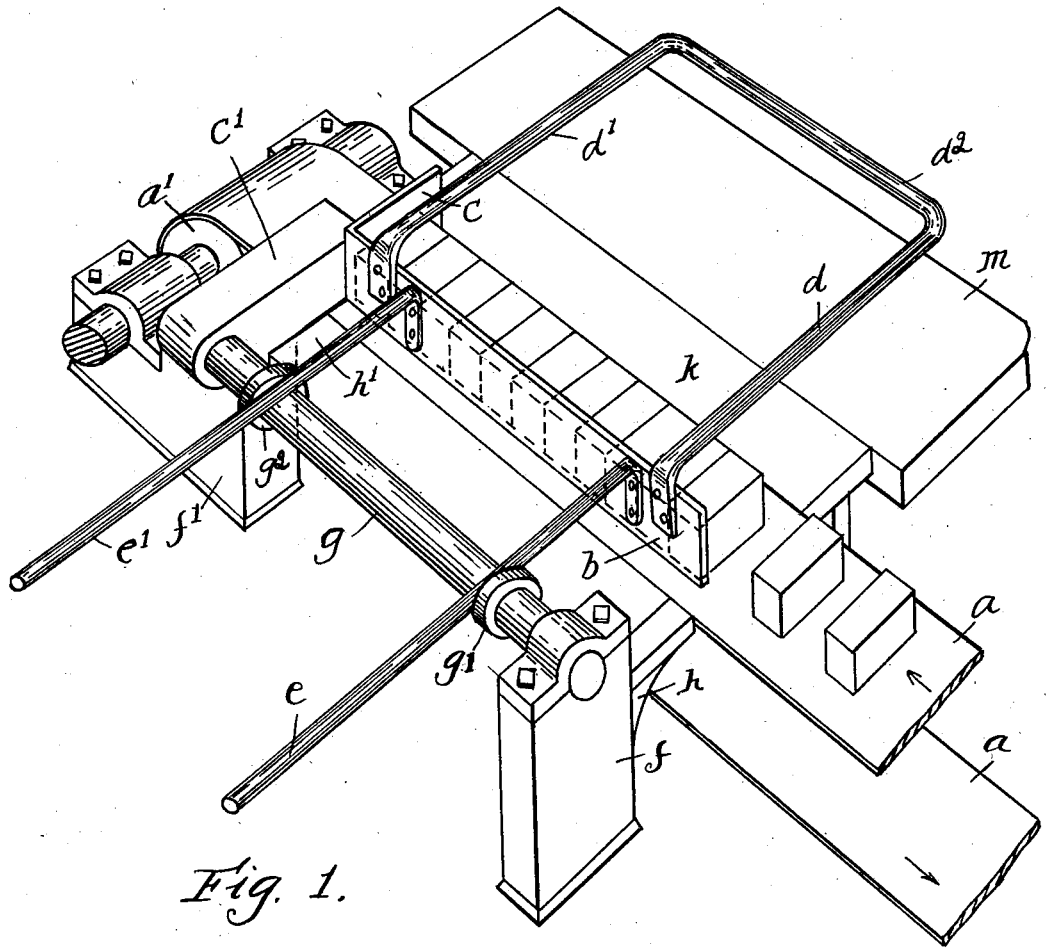
Figure 2:
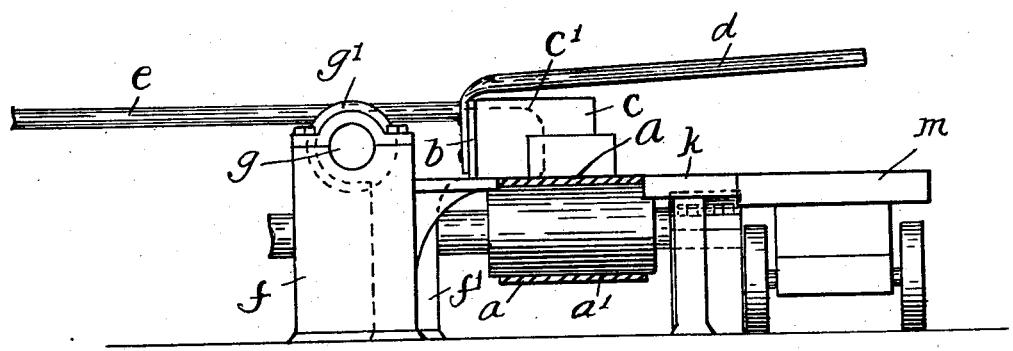

Figure 1 is a perspective view showing my invention. Fig. 2 is an end elevation, and Fig. 3 is a plan view thereof.

In the drawings, $a$ indicates the endless carrier of a brick-molding machine having a smooth oily surface, on which the bricks are successively delivered, so that they lie crosswise of the carrier. The carrier is driven in the direction of the arrows in Fig. 1, so that it is passed about a roll $a'$ at the end of its movement from the machine and then returned to the machine. At one side of the carrier and extending lengthwise thereof I provide a brick-engaging device, which preferably consists of a plate or board $b$ of nearly the same length as the platforms of the trucks ordinarily employed for conveying the bricks from the machine to the yard, and I also provide a brick-obstructing wall $c$, which is connected at one end to the end of the plate $b$ next the pulley $a'$ and extends transversely of the carrier and at right angles to the plate $b$, the plate $c$ being preferably as long as the carrier is wide. The lower edges of both plates are straight and smooth and occupy the same plane. Two parallel arms $e\ e'$ are rigidly secured to the back side of the plate $b$ and extend rearwardly therefrom at a level which is but slightly below the upper edge of said plate. A second pair of arms $d\ d'$ are also rigidly secured to the back side of the plate $b$ and extend over the upper edge thereof in the opposite direction from that of the arms $e\ e'$, the ends of said arms $d\ d'$ being connected by a handle or cross-bar $d^2$. A pair of standards $f\ f'$ are arranged at the rear side of the carrier, and a roller $g$ is journaled therein with its axis of rotation parallel to the direction in which the carrier is driven. The roller $g$ is of such size and so arranged that when the arms $e\ e'$ are resting thereon and the lower edge of plate $b$ is on a level with or resting on the carrier said plate $b$ will be substantially perpendicular to its surface. The roller $g$ is provided with a pair of circumferential flanges $g'\ g^2$, which are preferably beveled on their adjacent sides, the distance between said flanges being somewhat greater than the distance between the outer sides of the arms $e\ e'$, so as to permit of movement of the plate $b$ to an oblique position with respect to the carrier, as shown in dotted lines in Fig. 3.

Figure 3:
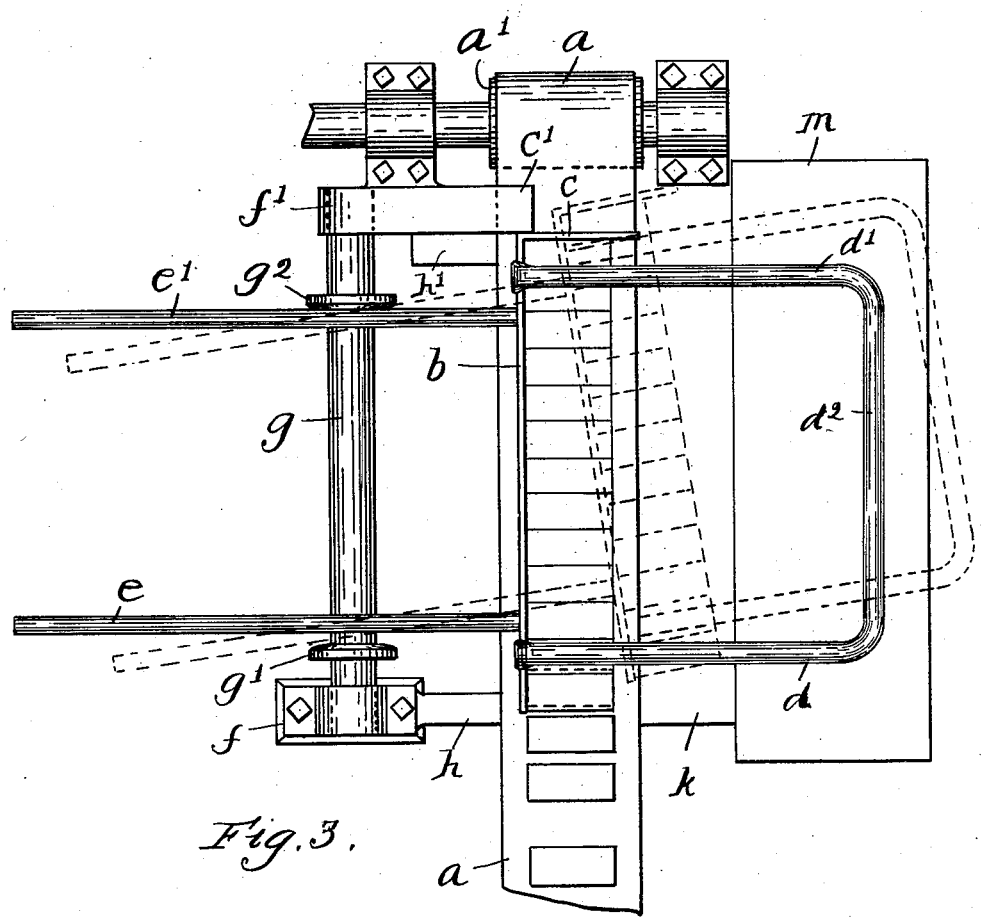

A stop $c'$ is rigidly supported by the standard $f'$ and projects for a short distance across the face of the carrier, as shown in Fig. 3, said stop $c'$ being so arranged that it will engage the side of the plate $c$ next the pulley $a'$ and closely adjacent to its point of connection with plate $b$ when said plate $c$ is in a position at right angles to and disposed crosswise the carrier and the adjacent arm $e'$ is resting against the adjacent flange $g^2$ of roller $g$.

A pair of brackets $h$ $h'$ are secured to the supports $f$ $f'$, respectively, their upper surfaces being on a level with or slightly above the upper surface of the carrier and extending from said surface to points near the adjacent edge of the carrier. A shelf $k$ is rigidly supported on a level with the upper surface of the carrier or slightly below said surface and on the opposite side of the carrier from the brackets $h$ $h'$.

$m$ indicates the platform of a truck, which is preferably employed for conveying the bricks from the carrier to the yard, said platform being substantially on a level with the shelf $k$, so that the surfaces of the carrier $a$, shelf $k$, and platform $m$ may form practically one continuous surface.

In normal operation the molding-machine delivers the green bricks rapidly upon the carrier, so that they are usually from one-fourth of an inch to one inch apart. The lower edges of plates $b$ and $c$ are preferably allowed to rest upon the carrier, the side of the plate $c$ resting against the stop $c'$ and the plate $b$ extending longitudinally and plate $c$ transversely of the carrier. The first brick which is discharged upon the carrier is carried along until it is stopped by the plate $c$, said plate engaging one side of the brick throughout its entire surface. As the carrier is smooth and oily, it readily slides under the brick, so that the latter is held in this position. The second brick will be carried against the first, and the succeeding bricks will be successively stopped in like manner until such a number have been collected that their combined thickness is substantially equal to the length of the plate $b$. The operator then draws the plates $b$ and $c$ forwardly across the carrier by handle $d^2$ onto the shelf $k$ and platform $m$ of the truck, causing the bricks which have been collected in front of the plate $b$ to slide from the carrier onto the shelf $k$ and then onto the platform of the truck. The operator then lifts up and pushes back on the handle $d^2$, leaving the bricks upon the truck and lifting the plate $b$ above the bricks, which by this time will have advanced to a point nearly opposite the middle of said plate. When plate $b$ has been pushed back over the bricks, it is lowered until both plates rest upon the carrier with the rear end of the plate $c$ pressed against the stop $c'$ before the first brick can reach the plate $c$. The bricks will then be collected again by the plate $c$ in front of the plate $b$, as before described. If the bricks are being delivered rapidly upon the carrier, the operator will not be able to draw the plate $b$ directly across and completely therefrom before the next brick to those which are being removed will be carried against the end of plate $b$. For this reason the stop $c'$ is made so that it only projects partly across the carrier, thereby enabling the operator as soon as he has moved the end of the plate $c$ beyond the end of the stop to draw said plates longitudinally of the carrier while he is drawing them across the same, so that they will move in an oblique direction, as indicated in the dotted position in Fig. 3, and the plate $b$ will not interfere with the succeeding bricks on the carrier while it is being drawn therefrom.

While it is generally more convenient to rest both plates $b$ and $c$ on the carrier while the bricks are being collected, yet plate $b$ may be moved back so that it rests on brackets $h$ $h'$, if desired, so that there will be no friction between it and the carrier. (See Fig. 2.) In such case the stop $c'$ may be shortened so that it does not project across the carrier at all. However, it has been found to be more convenient and desirable to have the support for the plate $c$ as nearly in line with the force which is applied thereto as is practicable.

The arms $e$ $e'$ must extend rearwardly from plate $b$ at such a distance above its lower edge that the bricks on the carrier will pass under said arms while the plates are being drawn onto the truck.

While I have shown a device of simple construction for transferring the bricks from the carrier to the truck, it will be apparent that devices of other constructions which perform similar functions may be readily produced, and I therefore do not wish to limit myself to the exact construction herein shown and described. It will be apparent, for example, that the plate $b$, which comprises the principal portion of the brick-engaging device, may be used without the plate $c$, which comprises the principal portion of the brick-obstructing wall; but as the bricks are usually delivered somewhat irregularly the collecting device is very desirable, particularly as the bricks will be loaded onto the trucks close together, enabling them to be more fully loaded than is usual when they are loaded by hand.

Having thus described my invention, what I claim as new, and desire to secure by Letters Patent, is—

1. The combination with the endless carrier of a brick-machine, of an elongated transversely-movable brick-engaging device located at one side of the carrier and extending lengthwise thereof, which engages a plurality of bricks on the carrier and moves them transversely to discharge them from the carrier, substantially as described.

2. The combination with the endless carrier of a brick-machine, of an obstructing-wall disposed crosswise the carrier, and an elongated transversely-movable brick-engaging device adjacent thereto, located at one side of the carrier and extending lengthwise thereof, substantially as described.

3. The combination with the endless carrier of a brick-machine, of an obstructing-wall disposed crosswise the carrier and an elongated transversely-movable brick-engaging device connected thereto, which is located at one side of the carrier and extends lengthwise thereof, substantially as described.

4. The combination with the endless carrier of a brick-machine, of an obstructing-wall disposed crosswise the carrier and an elongated brick-engaging device connected thereto located at one side of the carrier and extending lengthwise thereof and movable crosswise the carrier in an oblique direction, substantially as described.

5. The combination with the endless carrier of a brick-machine, of an elongated brick-engaging device located at one side of the carrier and extending lengthwise thereof, and supports therefor whereby said engaging device is movable crosswise the carrier in an oblique direction, substantially as described.

6. The combination with the endless carrier of a brick-machine, of two flat-faced plates extending respectively crosswise and lengthwise the carrier and connected together at substantially right angles to each other, and movable crosswise the carrier to discharge the bricks therefrom, substantially as described.

7. The combination with the endless carrier of a brick-machine, of an elongated transversely-movable brick-engaging device located at one side of the carrier and extending lengthwise thereof, a support for said engaging device at one side of the carrier and a handle connected with said engaging device, substantially as described.

8. The combination with the endless carrier of a brick-machine, of an obstructing-wall disposed crosswise the carrier and an elongated transversely-movable brick-engaging device connected thereto, which is located at one side of the carrier and extends lengthwise thereof, and a stop for holding the obstructing-wall while the bricks are being collected, substantially as described.

9. The combination with the endless carrier of a brick-machine, of an elongated transversely-movable brick-engaging device located at one side of the carrier and extending lengthwise thereof, a support for said engaging device which provides for an upward movement thereof and also a movement crosswise the carrier, substantially as described.

In testimony whereof I have signed my name to this specification in the presence of two subscribing witnesses.

ALPHONSE F. POTVIN.

Witnesses:
   LOUIS H. HARRIMAN,
   M. M. PIPER.